United States Patent [19]

Hasebe et al.

[11] Patent Number: 4,995,855
[45] Date of Patent: Feb. 26, 1991

[54] FLAT BELT TRANSMISSION

[75] Inventors: Kanteru Hasebe; Hiroshi Matsuoka; Kyotaro Yanagi, all of Kobe, Japan

[73] Assignee: Bando Chemical Industries, Inc., Kobe, Japan

[21] Appl. No.: 392,284

[22] Filed: Aug. 11, 1989

[51] Int. Cl.$^5$ ............................................. F16H 7/02
[52] U.S. Cl. .................................... 474/167; 474/189; 474/249
[58] Field of Search ........ 474/166, 167, 174, 184–189, 474/249–252

[56] References Cited

U.S. PATENT DOCUMENTS 1,356,917 10/1920 Hamm ................................. 474/189
2,054,619 9/1936 Freedlander ........................ 474/249

Primary Examiner—Thuy M. Bui
Attorney, Agent, or Firm—Wenderoth, Lind & Ponack

[57] ABSTRACT

A flat belt transmission has two spaced flat pulleys and a flat belt reeved around the flat pulleys. Each pulley can have a plurality of crowns arranged in the width direction of the outer periphery thereof. The flat belt can be a plurality of belts with a narrow width, one for each of the crowns. The flat belt can be a single belt with a part extending in the longitudinal direction of the belt in its inner periphery. The flat belt can be used with the flat pulley of the above construction or a flat pulley having a single crown of its outer periphery. In addition, the plurality of crowns are formed on the outer periphery of the flat pulley so as to be spaced at the same distance from the center of rotation of the pulley, or the outer periphery of the flat pulley can be in the form of a circular arc to change height of the crowns. The bearing stress generated in the belt is spread over the width of the belt, so that even if the widths of the pulley and the belt are increased, the transmission capacity of the flat belt can be increased.

6 Claims, 6 Drawing Sheets

FLAT BELT TRANSMISSION

BACKGROUND OF THE INVENTION

1. Field of the Invention

The present invention relates to a flat belt transmission comprising a flat pulley and a flat belt reeved around to the pulley and capable of transmitting a high load.

2. Prior Art

Heretofore, it has been well-known that in a flat belt transmission for transmitting a load by a flat belt and a flat pulley, as shown in FIG. 14, a crown 12 should be formed on the outer periphery of a pulley 11, which projects upwardly in the center of the pulley 11 in the width direction thereof in order to improve the tension distribution in the core 10a of a flat belt 10 and to prevent a snaking movement of the belt 10 (for example, as disclosed in Japanese Utility Model Laid Open Gazette No. 50-121147, Japanese Utility Model Laid Open Gazette No. 58-189844 and Japanese Utility Model Laid Open Gazette No. 62-2514).

In such a flat belt transmission, it has been conventionally throught that the shaft load (the load applied to the rotation shaft of one pulley 11 in a direction increasing the distance between shafts of the transmission pulleys) can be increased by increasing widths of the belt 10 and the pulley 11 with the result that transmission capacity can be increased and a high load can be transmitted. However, according to an experiment made by the inventors of the present invention, it was found that it was difficult to effectively transmit a high load even if the belt width was increased.

More specifically, the inventors of the present invention made an experiment in search of the relation between the width of the belt 10 and transmission capacity. According to the result of this experiment, as shown in FIG. 13, although the transmission capacity was increased in accordance with an increase in the belt width within the relatively narrow range of 12.7 mm–25.4 mm, the transmission capacity was not further increased even if the belt width was increased to 45 mm, at which width the capacity was almost the same as that when the width was 25.4 mm ("transmission capacity" on the ordinate of the graph shown in FIG. 13 is relatively shown by representing a predetermined value as a reference). From the result of the experiment, it was found that there was a limit to the amount the belt width could be increased and still improve transmission capacity in the flat belt transmission. In addition, the above experiment was made under the condition that the shaft load was 200 kg, the pair of flat pulleys 11 around which the belt 10 was reeved were 100 mm in diameter, the crown 12 of the pulley 11 had a 450 mm radius and the pulley 11 on the driving side was rotated at 2600 rpm. The slip ratio between the pulley 11 and the belt 10 was 1%–3%.

In order to find the reason for this, the bearing stress (the stress acting between the belt 10 and the pulley 11) generated in the belt 10 was measured and it was found that the bearing stress was not uniformly distributed. It was determined that the reason why transmission capacity was not increased in accordance with the increase in the belt width was due to a non-uniform distribution characteristic of the bearing stress generated in the belt 10. More specifically, because the crown 12 was convex at the center in the width direction of the pulley 11, it was found that the bearing stress of the belt 10 concentrated or peaked at the center thereof corresponding to the crown 12 as shown in FIG. 3(a). Therefore, as shown in FIG. 3(b), when the width of the belt 10 is increased, a portion which does not contribute to load transmission because the bearing stress is zero, is generated at both ends in the width direction of the belt 10 due to the peaking of the bearing stress in the center. Therefore, the width of contact of the belt 10 with the pulley 11 is not increased even if the belt width is further increased. Furthermore, a maximum bearing stress $\delta$max at a part corresponding to the crown 12 of the pulley 11 is increased in accordance with an increase in the belt width and the shearing stress on the belt 10 is increased at the time of transmission, which exceeds the capacity of the belt, causing creeping movement and destruction of the belt 10, with the result that transmission capacity can not be effectively increased.

However, if there is no crown 12 on the outer periphery of the pulley 11, tension generated in the belt 10 is not uniform and snaking movement of the belt 10 is generated, causing the belt 10 to be destroyed at an early stage of transmission.

SUMMARY OF THE INVENTION

The present invention has been made to solve the problem described above. A principal object of the present invention is to effectively increase transmission capacity of a flat belt transmission, by improving the structure of the crown of a flat pulley, the structure of a flat belt, or both structures, so as to increase the contact width of the flat belt with the pulley having the crown if the width of the flat belt and the flat pulley is increased.

In order to attain the above object, according to the present invention, the bearing stress generated in a belt is spread in the width direction of the whole belt by forming at least two crowns on the outer periphery of the pulley in the width direction of the flat pulley. More specifically, according to the present invention, at least two crowns are arranged in a row on the outer periphery of the flat pulley in the pulley width direction.

The flat belt of the flat belt transmission of the invention comprises a belt body having a plurality of endless cores in parallel with each other within the belt body and having a trench of a predetermined depth extending in the longitudinal direction of the belt on the inner periphery of the belt body which is in contact with the pulley. The trench is located in the width direction of the belt such that when the flat belt is placed around the flat pulley having at least two crowns arranged in a row in the width direction of the pulley, the trench is aligned with a part of the pulley other than that on which a crown is formed.

Alternatively, the flat belt of the above construction, that is, the flat belt having a trench formed in the inner periphery of the belt body, can be combined with a flat pulley of a conventional construction in which only one crown is provided on the outer periphery. In this case, the belt is transversely bent over the crown of the pulley at the trench, so that it is possible to improve the transmission capacity even for the conventional pulley because the contact width of the pulley with the belt is increased.

In order to further increase transmission capacity by an increase in the width of the flat pulley, the pulley can have a plurality of crowns, and the flat belt reeved around the flat pulley can be replaced by a plurality of belt members corresponding to the number of crowns and spaced from each other at equal distances and having a width corresponding to the width of the crown.

When crowns are arranged on the outer periphery of the flat pulley, the crowns are arranged such that they are spaced apart at the same distance from the center of rotation of the pulley. Alternatively, the outer periphery of the pulley can have a cross-section in the form of a circular arc such that the center of the outer periphery in the width direction is farther from the center of rotation of the pulley than the ends thereof and the crowns are arranged along this outer periphery in the width direction of the pulley. The former arrangement can improve transmission capacity more than the latter.

The trench formed in the inner periphery of the belt body can have a rectangular cross-section and the corners between the side walls and the bottom are circular arc surfaces, or the trench can have a V-shaped section and its bottom is a circular arc surface.

BRIEF DESCRIPTION OF THE DRAWINGS

The nature and advantages of the present invention will be made more apparent from the following description together with the accompanying drawings, in which.

DESCRIPTION OF PREFERRED EMBODIMENTS

Embodiments of the present invention will be described below with reference to accompanying drawings.

Figure 1:
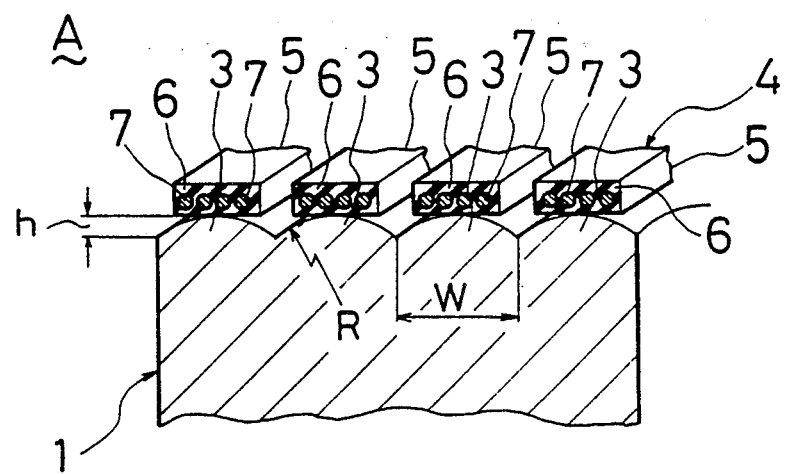
FIG. 1 is an enlarged sectional view showing a main part of a belt transmission according to a first embodiment of the present invention.

FIG. 1 shows a belt transmission A in accordance with a first embodiment of the present invention. The belt transmission A comprises a flat pulley 1 for transmitting a high load and a flat belt means 4 reeved around the pulley 1. The outer periphery of the pulley 1 is a generally cylindrical surface spaced at a uniform distance from the center of rotation (not shown) of the pulley 1 and four crowns 3 are arranged in a row in the width direction of the pulle 1 on this outer periphery. Therefore, the crowns 3 are all at the same distance from the shaft (not shown) on which the pulley is mounted and the crowns 3 have the same width w, height h and radius of curvature R, respectively.

The flat belt means 4 comprises four belt members 5 separated from each other in the width direction. Each of the belt members 5 comprises a belt body 6 and a plurality of cores 7 buried in the belt body 6 and extending in the longitudinal direction of the belt member. The width of each belt member 5 corresponds to the width w of the corresponding crown 3.

Figure 2:
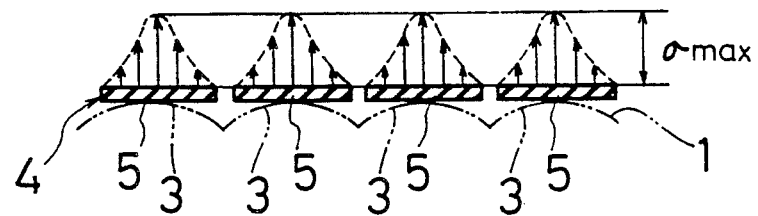
FIG. 2 is a diagram for showing the pressure distribution characteristic in the belts of the first embodiment.
Figure 3A:
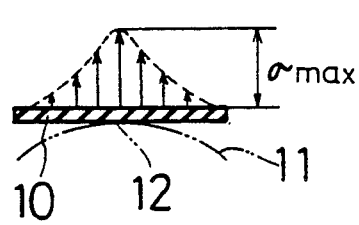
FIGS. 3a and 3b are diagrams showing the pressure distribution characteristic in a belt in a conventional belt transmission.
Figure 3B:
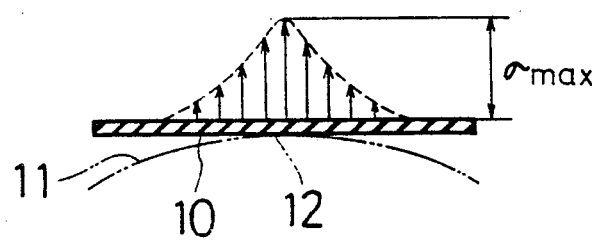

Since four crowns 3 are provided in the width direction of the pulley on the outer periphery of the pulley 1, the bearing stress generated in the flat belt means 4 peaks at the center in the width direction of the respective belt members 5 corresponding to the respective crowns 3 on the pulley 1 as shown in FIG. 2. In other words, the bearing stress is distributed more evenly in the width direction of the flat belt 4 as the whole than where there is only a single crown and a single flat belt. As a result, the maximum value $\delta max$ of the bearing stress at each crown 3 of the pulley 1 can be controlled even if the overall width of the flat pulley 1 is increased, and the maximum bearing stress in the belt means 4 does not exceed the capacity of any belt member, with the result that transmission capacity can be increased.

Figure 4:
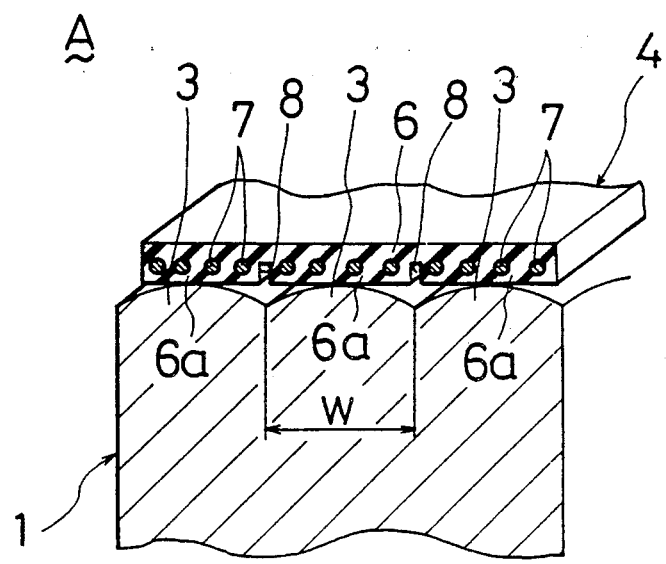
FIG. 4 is a sectional view similar to FIG. 1 and showing a second embodiment.
Figure 5:
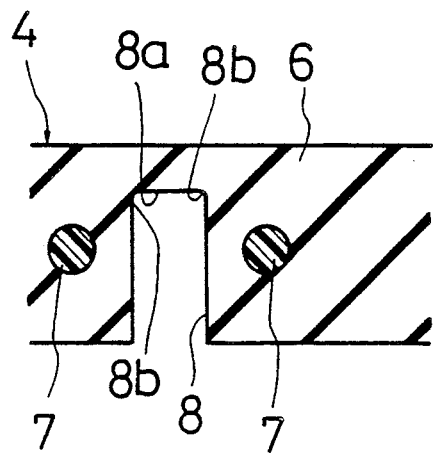
FIG. 5 is an enlarged partial sectional view showing a trench in a belt in the second embodiment.
Figure 6:
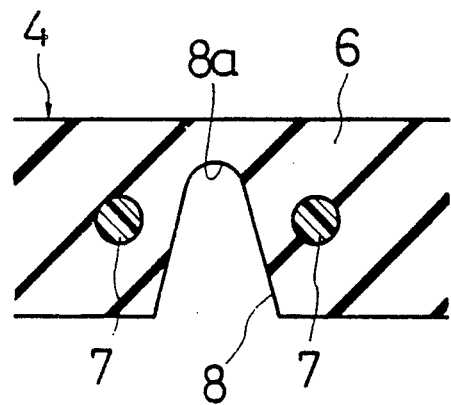
FIG. 6 is a view similar to FIG. 5 showing a variation of the trench in the belt.

FIG. 4 shows a second embodiment. In this embodiment, three crowns 3 are provided in the width direction of a pulley 1 on the outer periphery of the pulley 1. The flat belt means 4 comprises a belt body 6 made of rubber and having a plurality of endless cores 7 made of a resin and buried in parallel to each other in the belt body 6. Two trenches 8 with bottoms extending in the longitudinal direction of the belt are formed at positions corresponding to one-third and two-thirds of the belt width in the width direction of the belt, the trenches being in the inner peripheral surface of the belt body 6 which is in contact with the pulley 1 and dividing the belt body into belt parts 6a . Each trench 8 extends between adjacent cores 7 and its bottom is nearer to the outer peripheral surface of the belt than the position of the cores 7 as shown in FIG. 5. The trench 8 can have a rectangular cross-section and the corners 8b and 8b between its bottom 8a and the side walls thereof are circular arc surfaces. More specifically, for example, in a flat belt 4 having a width of 38.1 mm and a thickness of 3.5 mm and cores 7 buried at a positions spaced 1.5 mm from the outer peripheral surface, trenches 8 are formed at positions corresponding to one-third and two-thirds of the belt width and in the width direction thereof, which are 1 mm and 2.6 mm in width and depth, respectively. Alternatively, the trench 8 can have a V-shaped cross-section and its bottom 8a can be a circular arc surface. Also, the trench 8 can be a shallow trench having the bottom nearer to the inner surface of the belt than the position of the cores 7.

The position of the trenches is between the crowns 3 of the pulley. In other words, the crown 3 is formed at the position corresponding to a part 6a in the belt body 6 in which no trench 8 is formed. In addition, the width of the part 6a in the belt body 6 in which the trench 8 is not formed is approximately the same as the width w of the crown 3 of the pulley 1.

Figure 7:
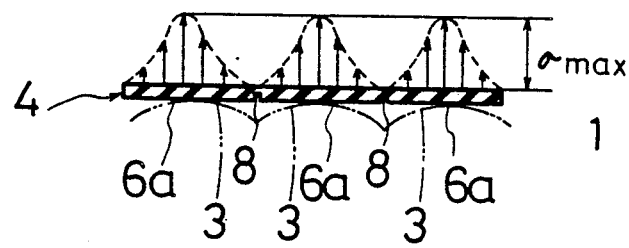
FIG. 7 is a diagram showing the pressure distribution characteristic in the belt of the second embodiment.

Therefore, since in this embodiment two trenches 8 are formed in the width direction of the belt 4 in the inner peripheral surface and three crowns 3 are provided on the outer periphery of the pulley at positions corresponding to the parts 6a of the belt 4 in which the trenches are not formed, the bearing stress in the flat belt 4 peaks the centers of the parts 6a corresponding to each of the crowns 3 on the pulley 1 as shown in FIG. 7. Therefore, similar to the above described embodiment, the bearing stress is distributed more evenly in the belt width direction across the whole of the width of the flat belt 4, which limits the maximum bearing stress at the crowns 3 of the pulley 1, with the result that the shearing stress of the belt 4 does not exceed its maximum and transmission capacity can be increased.

Figure 8:
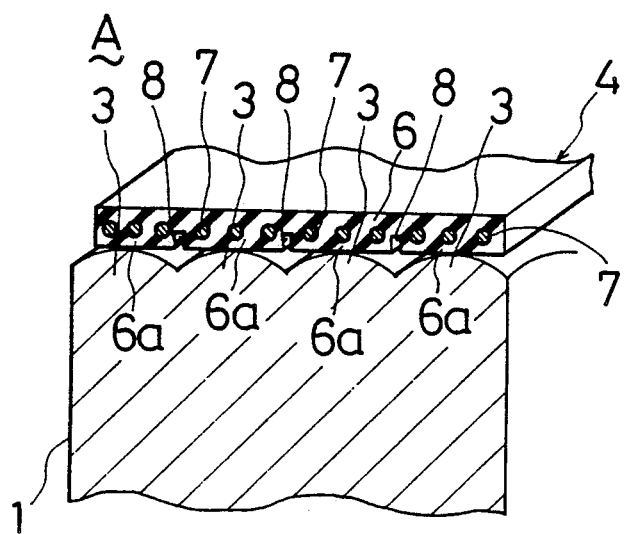
FIG. 8 is a view similar to FIG. 1 showing a third embodiment.

FIG. 8 shows a third embodiment which is similar to the second embodiment in that trenches 8 are formed in the inner peripheral surface of the flat belt 4, but in this embodiment, three trenches 8 are formed and four crowns 3 are formed in the width direction of a pulley in accordance with the number of the trenches 8. The same effect as that in the above described embodiment is provided in this embodiment.

Figure 9:
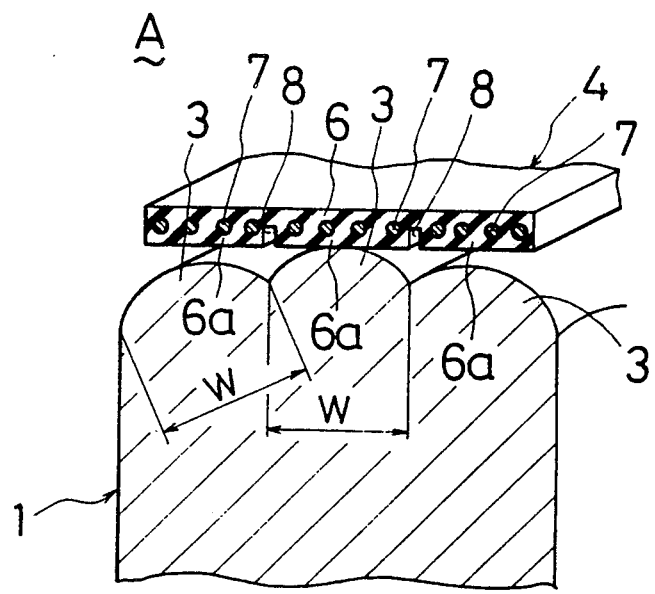
FIG. 9 is a view similar to FIG. 1 showing a fourth embodiment.

FIG. 9 shows a fourth embodiment. Whereas in the second and third embodiments the outer periphery on which crowns 3 are formed is a generally cylindrical surface with the parts spaced at the same distance from the center of rotation of the pulley, the outer periphery of the pulley 1 in this embodiment is in form of a circular arc such that the center in a width direction is farther from the center of rotation of the pulley than the two sides thereof. Three crowns 3 are arranged in a row in the pulley width direction on the outer periphery. The construction of the flat belt 4 is the same as in the second embodiment (shown in FIG. 4). In this embodiment, transmission capacity is further improved over the capacity in the second and third embodiments.

Figure 10:
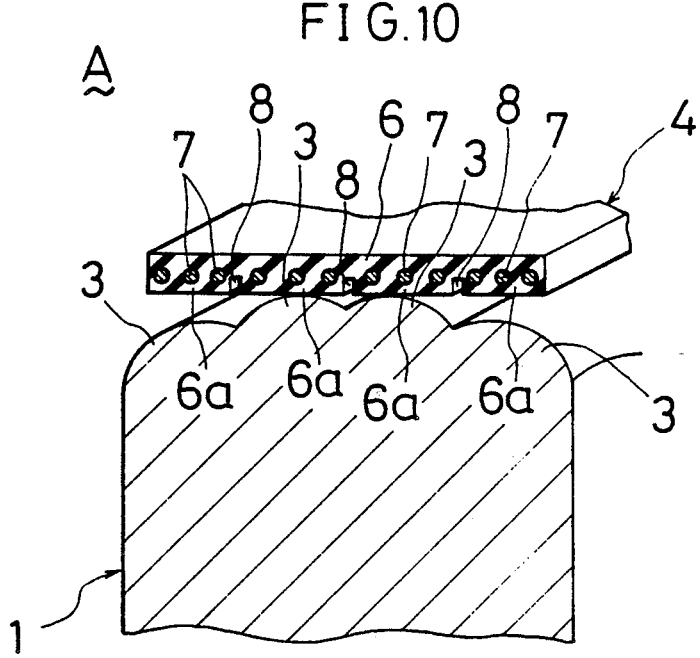
FIG. 10 is a view similar to FIG. 1 showing a fifth embodiment.

FIG. 10 shows a fifth embodiment of the present invention which is similar to the fourth embodiment, except that the number the crowns 3 and trenches 8 are four and three, respectively instead of three and two. Otherwise the construction is the same as that in the fourth embodiment, and the same effect can be achieved.

Figure 14:
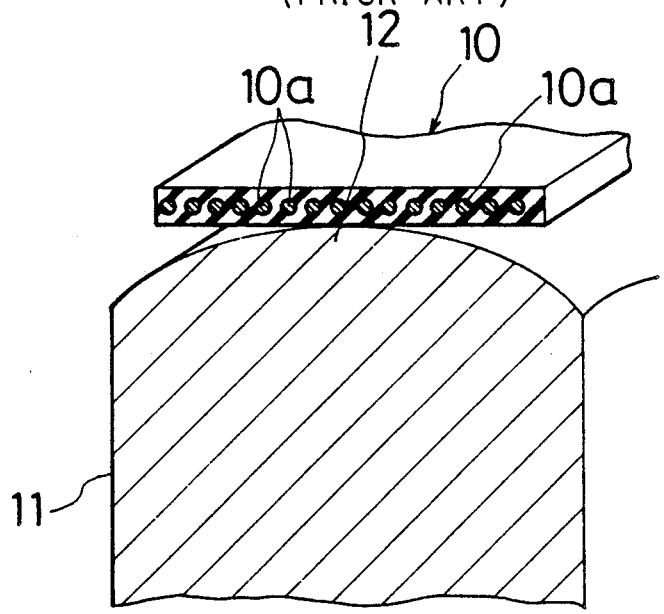
FIG. 14 is a sectional view similar to FIG. 1 of a conventional belt transmission.

In a further embodiment, a flat belt 4 having trenches 8 in the inner peripheral surface as in the above embodiment can be used with a conventional pulley as shown in FIG. 14, having one crown on the outer periphery. In this case, the belt 4 is bent along the crown of the pulley because of the trenches, with the result that the contact width of the belt with the pulley can be increased and the transmission capacity can be raised.

Figure 11:
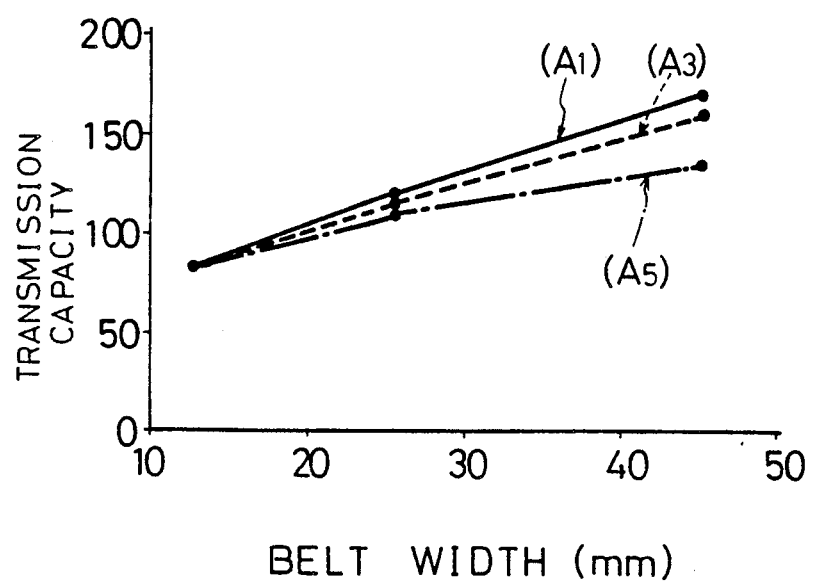
FIG. 11 is a graph showing a change in the characteristic of transmission capacity in accordance with the width of the belt of the belt transmission of the first, second and fifth embodiments.

Finally, a description will be given of a specific example. Three kinds of belt transmissions A1, A3 and A5 corresponding to the first, third and fifth embodiments, respectively were made. Also, three kinds of flat belts 4 with widths of 12.7 mm, 25.4 mm and 45 mm were prepared and three kinds of flat pulleys 1 with widths corresponding to those of the flat belts 4 and a diameter of 100 mm were provided. More specifically, when the belt width was 45 mm, three crowns 3 were formed on the pulley and when it was 25.4 mm, two crowns 3 were formed. In addition, when it was 12.7 mm, the conventional one crown was provided. The crown 3 of the pulley 1 had a radius of 450 mm. Each belt 4 was reeved around a pair of spaced flat pulleys 1 and one pulley 1 was rotated at 2600 rpm under a shaft load of 200 kg and the transmission capacity was tested. As a result, the characteristic shown in FIG. 11 was obtained. In addition, the slip ratio between the pulley 1 and the belt 4 was 2%.

Figure 12:
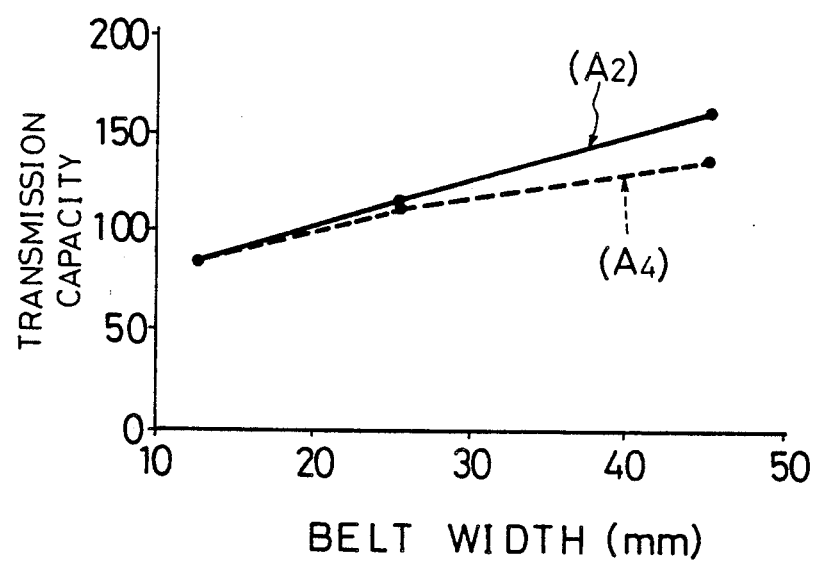
FIG. 12 is a graph showing a change in the characteristic of transmission capacity in accordance with the width of the belt of the belt transmission of the second and fourth embodiments.
Figure 13:
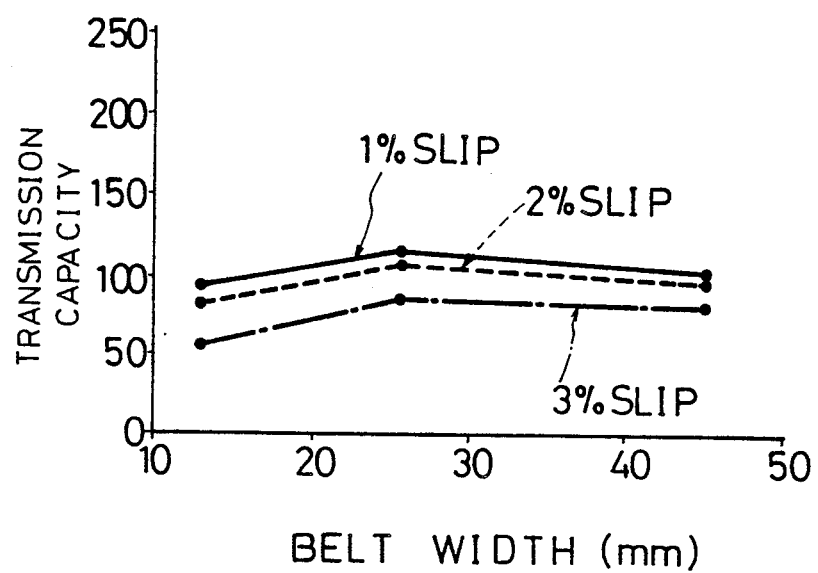
FIG. 13 is a graph showing a change in the characteristic of transmission capacity in accordance with the width of the belt of a conventional belt transmission.

The same test was made on the two kinds of belt transmissions A2 and A4 corresponding to the second and fourth embodiments, respectively. As a result, the characteristic shown in FIG. 12 was obtained. As is apparent from the characteristics shown in FIGS. 11 and 12, it is seen that belt transmission capacity will not reach a limit even if the belt width is greatly increased according to the present invention, as compared with the conventional belt transmission the characteristic of which is shown in FIG. 14, and it is possible to increase transmission capacity in accordance with the increase in the belt width.

According to the present invention, it is possible to obtain a high transmission capacity by increasing the belt width and the pulley width in a flat belt transmission using a modified flat belt and a modified flat pulley. Therefore, a flat belt transmission can be used without providing another belt transmission for transmitting a high load in a transmission system requiring transmission of a high load, so that the range of use of flat belt transmissions can be widened. In addition, since a trench is formed in the inner peripheral surface of the flat belt or a plurality of crowns are formed on the outer periphery of the flat pulley, the structure is simple. In view of these effects, the present invention can have very high degree of usefulness.

What is claimed is:

1. A flat belt transmission comprising:
   two spaced flat pulleys and a flat belt reeved around said pulleys, said flat belt comprising a belt body having a plurality of endless cores and having at least one trench with a predetermined depth extending in the longitudinal direction of the belt in the inner peripheral surface of said belt body which is in contact with said pulleys and dividing said belt body into belt parts; and
   each flat pulley having at least two crowns on the outer periphery thereof each having a cross-section in the shape of an arc in the width direction of the outer periphery of the pulley and spaced in the width direction of the outer periphery of the pulley;
   said belt parts engaging corresponding crowns for spreading the bearing stress in said belt parts from a peak value at the center to a low value at the edges.

2. A flat belt transmission as claimed in claims 1 in which the crowns of the flat pulleys are at equal distances from the center of rotation of the pulley.

3. A flat belt transmission as claimed in claim 1 in which the outer periphery of each flat pulley is substantially in the form of a cylindrical arc in the width direction, and the center in the width direction of each pulley is farther from the center of rotation of the pulley than the ends thereof, and said outer periphery having crowns therealong in the width direction of the pulley.

4. A flat belt transmission as claimed in claim 1 in which the trench in the flat belt has a rectangular cross-section and each of the corners between the bottom and the sidewalls is a circular arc in cross-section.

5. A flat belt transmission as claimed in claim 1 in which the trench in the flat belt has a V-shaped cross-section and the bottom is a circular arc in cross section.

6. A flat belt transmission as claimed in claim 1 in which said endless cores are spaced inwardly from the surfaces of said flat belt and said trench extends toward the outer peripheral surface of said belt and has the bottoms thereof spaced from the outer peripheral surface of said belt a distance less than the spacing of said endless cores from the outer peripheral surface of said belt.

* * * * *